(12) United States Patent
Carvignese et al.

(10) Patent No.: US 9,429,080 B2
(45) Date of Patent: Aug. 30, 2016

(54) METHOD FOR CONTROLLING A MOTOR-VEHICLE PROVIDED WITH AN INTERNAL COMBUSTION ENGINE HAVING A SYSTEM FOR VARIABLE ACTUATION OF THE INTAKE VALVES

(75) Inventors: Cosimo Carvignese, Turin (IT); Roberto Finizio, Chieri (IT); Fabio Borean, Avigliana (IT); Marco Cuniberti, Turin (IT)

(73) Assignee: C.R.F. Società Consortile per Azioni, Orbassano (Torino) (IT)

( * ) Notice: Subject to any disclaimer, the term of this patent is extended or adjusted under 35 U.S.C. 154(b) by 318 days.

(21) Appl. No.: 14/241,688

(22) PCT Filed: Jul. 5, 2012

(86) PCT No.: PCT/IB2012/053430
§ 371 (c)(1),
(2), (4) Date: Feb. 27, 2014

(87) PCT Pub. No.: WO2013/050887
PCT Pub. Date: Apr. 11, 2013

(65) Prior Publication Data
US 2014/0202423 A1 Jul. 24, 2014

(30) Foreign Application Priority Data
Oct. 3, 2011 (EP) .................................. 11183663

(51) Int. Cl.
*F02D 13/00* (2006.01)
*F02D 13/02* (2006.01)
(Continued)

(52) U.S. Cl.
CPC ............ *F02D 13/0238* (2013.01); *F01L 1/08* (2013.01); *F01L 9/025* (2013.01); *F01L 13/0015* (2013.01);
(Continued)

(58) Field of Classification Search
CPC .......... F01L 13/0015; F01L 2013/118; F02D 13/0215; F02D 13/0261; F02D 13/0207; F02D 13/0238; F02D 41/001
USPC ............ 123/321, 319, 346, 347, 348, 90.15, 123/90.16, 90.17, 90.27, 90.31
See application file for complete search history.

(56) References Cited

U.S. PATENT DOCUMENTS 6,026,921 A * 2/2000 Aoyama .................. B60K 6/48
                                                        123/348
6,053,134 A * 4/2000 Linebarger .............. F01L 1/185
                                                        123/90.16

(Continued)

FOREIGN PATENT DOCUMENTS

| EP | 1936132 A1 | 6/2008 |
|----|------------|--------|
| JP | 2010071205 A | 4/2010 |
| WO | 2008110910 A1 | 9/2008 |

OTHER PUBLICATIONS

International Search Report for PCT/IB2012/053430 dated Jan. 17, 2013.

*Primary Examiner* — Mahmoud Gimie
(74) *Attorney, Agent, or Firm* — Heslin Rothenberg Farley & Mesiti P.C.; Victor A. Cardona, Esq.

(57) ABSTRACT

A motor vehicle provided with an internal combustion engine having a system for variable actuation of the intake valves has a phase of activation of an operating mode with the engine off and the vehicle moving, in which the fuel supply to the engine is cut-off. After the cut-off of the fuel supply to the engine, the system for variable actuation of the intake valves is controlled to vary the opening time and/or closing time and/or the lift of the intake valves so as to control the losses due to the pumping effect which occur within the engine in cut-off condition.

9 Claims, 5 Drawing Sheets

Figure 1:
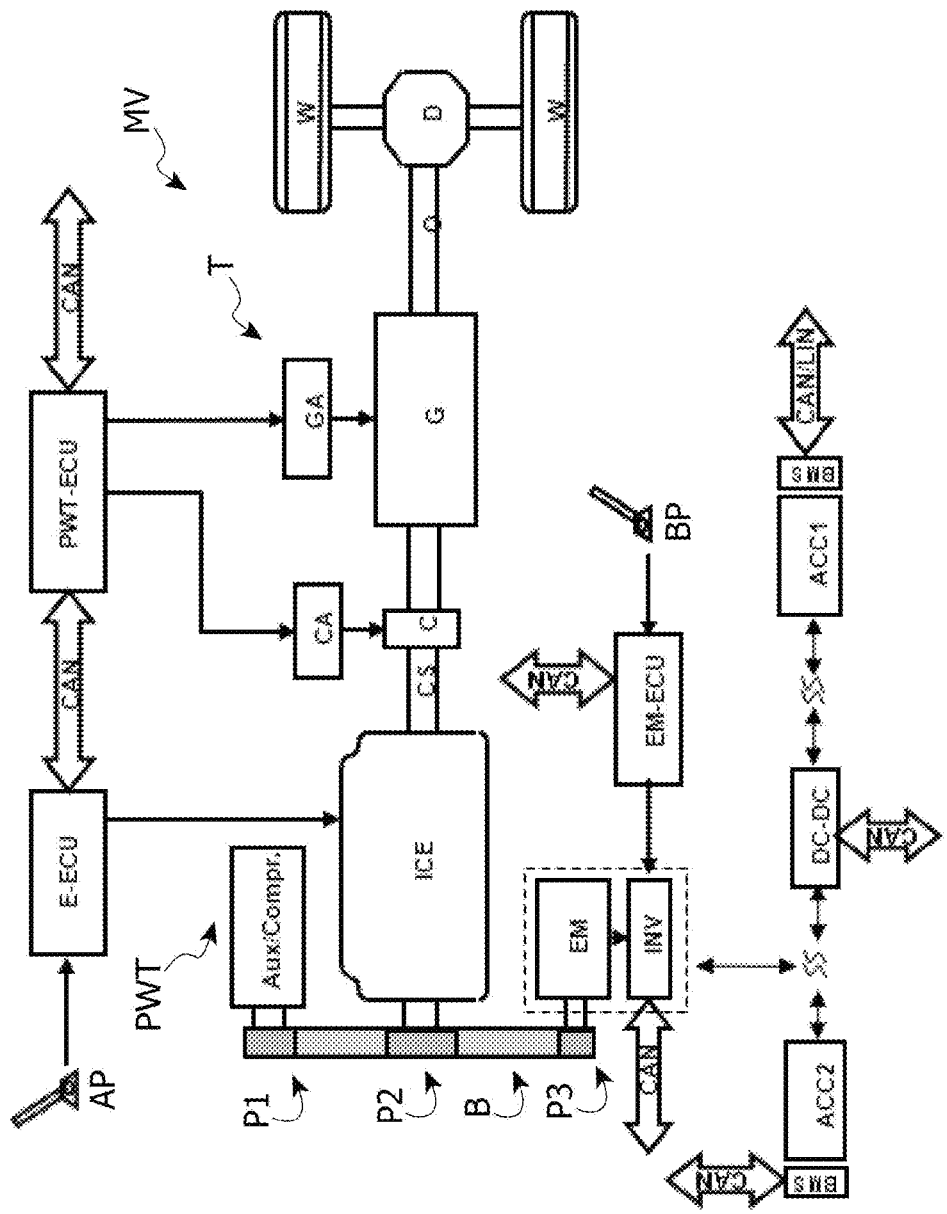

(51) Int. Cl.
  *F01L 13/00* (2006.01)
  *F02D 41/04* (2006.01)
  *F02D 41/06* (2006.01)
  *F02N 11/00* (2006.01)
  *F02N 11/08* (2006.01)
  *F02N 19/00* (2010.01)
  *F01L 1/08* (2006.01)
  *F01L 9/02* (2006.01)
  *F02D 41/00* (2006.01)
  *F01L 1/18* (2006.01)
  *F01L 1/26* (2006.01)

(52) U.S. Cl.
  CPC ....... *F01L 13/0026* (2013.01); *F02D 13/0207* (2013.01); *F02D 13/0215* (2013.01); *F02D 13/0226* (2013.01); *F02D 13/0265* (2013.01); *F02D 41/042* (2013.01); *F02D 41/065* (2013.01); *F02M 26/01* (2016.02); *F02N 11/003* (2013.01); *F02N 11/0844* (2013.01); *F02N 19/004* (2013.01); *F01L 1/185* (2013.01); *F01L 1/267* (2013.01); *F01L 2013/118* (2013.01); *F01L 2105/00* (2013.01); *F01L 2820/01* (2013.01); *F02D 2041/001* (2013.01); *Y02T 10/18* (2013.01); *Y02T 10/48* (2013.01)

(56) References Cited

U.S. PATENT DOCUMENTS

| | | | |
|---|---|---|---|
| 6,341,584 B1* | 1/2002 | Itoyama | B60K 6/48 123/179.16 |
| 7,819,100 B2* | 10/2010 | Canino | F01L 1/08 123/90.12 |
| 2010/0114461 A1 | 5/2010 | Gibson | |
| 2010/0305820 A1 | 12/2010 | McGee et al. | |

* cited by examiner

METHOD FOR CONTROLLING A MOTOR-VEHICLE PROVIDED WITH AN INTERNAL COMBUSTION ENGINE HAVING A SYSTEM FOR VARIABLE ACTUATION OF THE INTAKE VALVES

CROSS REFERENCE TO RELATED APPLICATIONS

This application is a 371 National Phase of PCT International Application No. PCT/IB2012/053430 filed on Jul. 5, 2012, and published in English as WO 2013/050887 A1 on Apr. 11, 2013, which claims priority to European Patent Application No. 11183663.1 filed on Oct. 3, 2011, the entire disclosures of which are incorporated herein by reference.

The present invention regards a method for controlling a motor vehicle provided with an internal combustion engine having a system for variable actuation of the intake valves.

The main object of the present invention is to exploit the system for variable actuation of the intake valves of the internal combustion engine to obtain more efficient operating modes of the vehicle, in particular with reference to an operating mode with the vehicle moving and engine in cut-off condition, as well as for example even with reference to the phase for starting the engine. A further object is to exploit the aforementioned system to increase the efficiency of an e-motoring operating mode, i.e. the electric propulsion alone, in a hybrid vehicle provided with an electric motor kinematically arranged upstream of the internal combustion engine.

With the aim of attaining the aforementioned main object, the invention aims at providing a method for controlling a motor vehicle provided with an internal combustion engine having a system for variable actuation of the intake valves, characterised in that said method comprises a phase of activation of an operating mode with the engine off and the vehicle moving, in which the fuel supply to the engine is cut-off, and in that after the cut-off of fuel supply the to the engine the system for variable actuation of the intake valves is controlled to vary the opening time and/or closing time and/or the lift of the intake valves so as to control the losses due to the pumping effect which occur within the engine in said cut-off condition, according to one of the following strategies:

- if the speed of the engine is above the minimum-run threshold, the intake valves are controlled so as to temporarily minimise the pumping losses, to increase the engine run-down time, so as to allow a possible change-of-mind of the driver, and a restart of the engine by reactivating the fuel supply;
- if the speed of the engine is below the minimum-run threshold one of the following strategies are actuated:
- if the motor vehicle is provided with an electric start motor capable of operating with the internal combustion engine moving, the intake valves are controlled so as to temporarily minimise the pumping losses to increase the run-down time, i.e. the time required to reach the stop of the drive shaft, so as to be able to restart the internal combustion engine when it is still moving;
- if the motor vehicle is provided with an electric start motor capable of operating only when the internal combustion engine is stationary, the intake valves are controlled so as to temporarily maximise the pumping losses to reduce the engine run-down time, with the aim of allowing a possible engine restart with the engine stationary as soon as possible.

According to a further preferred characteristic of the invention, the system for variable actuation of the intake valves is also controlled to reduce the pumping losses in the phase in which the internal combustion engine is started through an electric start motor.

According to the invention, the increase of the pumping losses of the internal combustion engine is obtained by controlling the system for variable actuation of the intake valves such to cause a delayed opening of the intake valves with respect to a conventional intake cycle, or a total absence of opening of the intake valves.

The reduction of the pumping losses of the internal combustion engine is obtained by controlling the system for variable actuation of the intake valves such to cause a closing of the intake valves in advance with respect to a conventional intake cycle.

Preferably, with the aim reducing the aforementioned pumping losses to the minimum, said system for variable actuation of the intake valves is controlled so as to open the intake valves during a phase which—during the normal operation of the engine—corresponds to the exhaust phase, with the aim of obtaining a recirculation—in each cylinder—of the exhaust gases produced in the engine immediately before the cut-off phase.

In the preferred embodiment, the internal combustion engine is provided having a system for variable actuation of the engine valves of the type developed under the MULTI-AIR trademark by the applicant (see for example EP-A-1 936 132). Such system comprises at least one camshaft connected to the drive shaft, and it is of the type in which each intake valve is controlled by a respective tappet actuated by a respective cam of said camshaft, against the action of spring means associated to each intake valve which return the intake valve towards a closed position, and in which said tappet is connected to said intake valve through hydraulic actuation means, comprising a pressure hydraulic chamber which can be connected to an exhaust channel through an electronic control solenoid valve, so as to uncouple the intake valve from the respective cam and cause the closing thereof due to said return spring means.

According to a further characteristic of the invention, said system for variable actuation of the intake valves is controlled so as to differently actuate intake valves associated to different cylinders and/or so as to differently actuate the same intake valve over time as a function of the engine operating conditions, detected by an electronic control unit through a plurality of sensors.

In an embodiment, the vehicle is provided, additionally to the internal combustion engine, with an electric motor kinematically connected to the internal combustion engine, upstream of the internal combustion engine, i.e. with the internal combustion engine kinematically interposed between the electric motor and the driven wheels of the vehicle and there is provided for an e-motoring phase in which the electric motor is used as the only motor vehicle propulsion engine, with the internal combustion engine in cut-off condition, and in that in such e-motoring phase the system for variable actuation of the intake valves is controlled to reduce the pumping losses of the engine.

Figure 2:
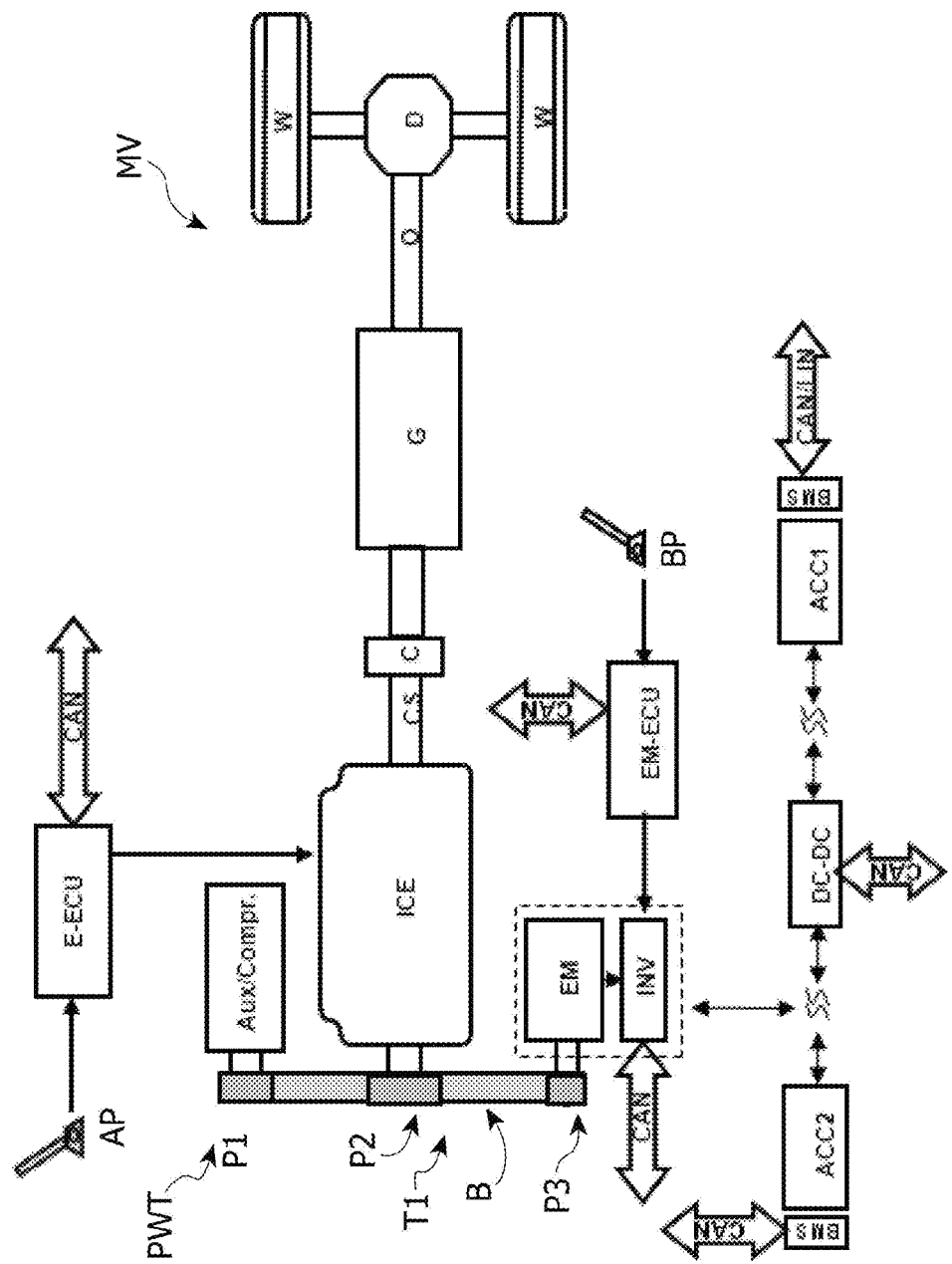
Figure 3:
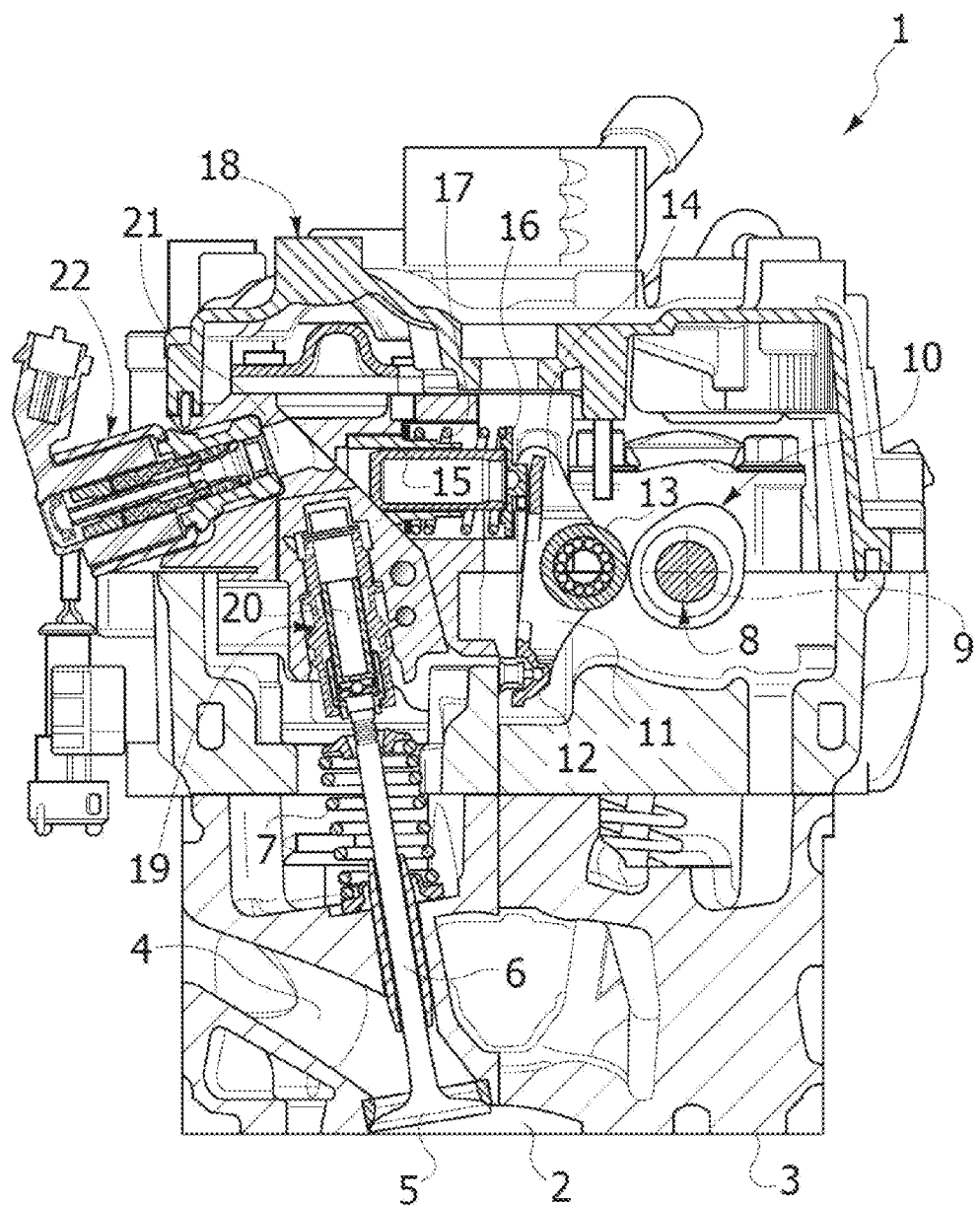
Figure 4:
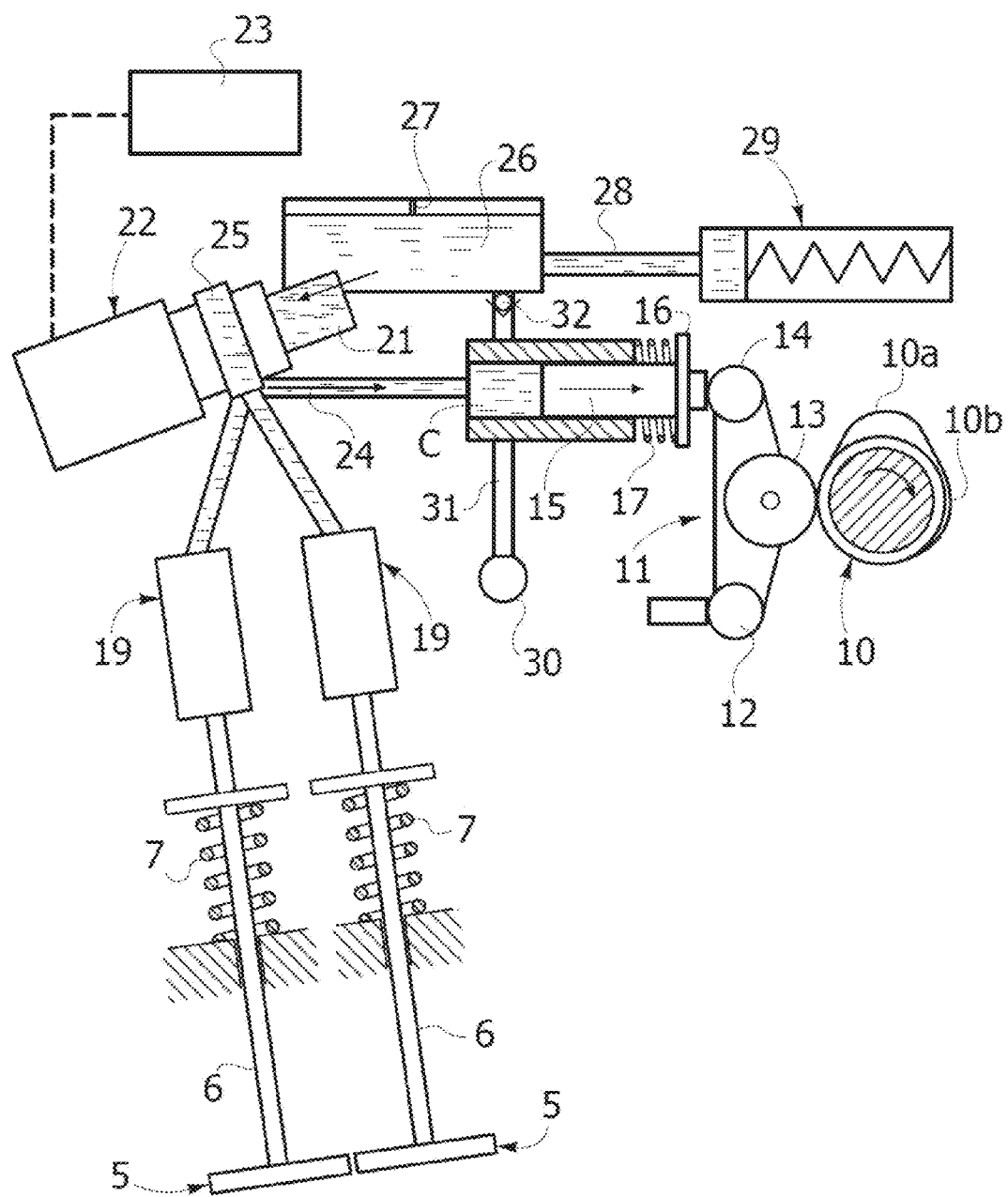
Figure 5:
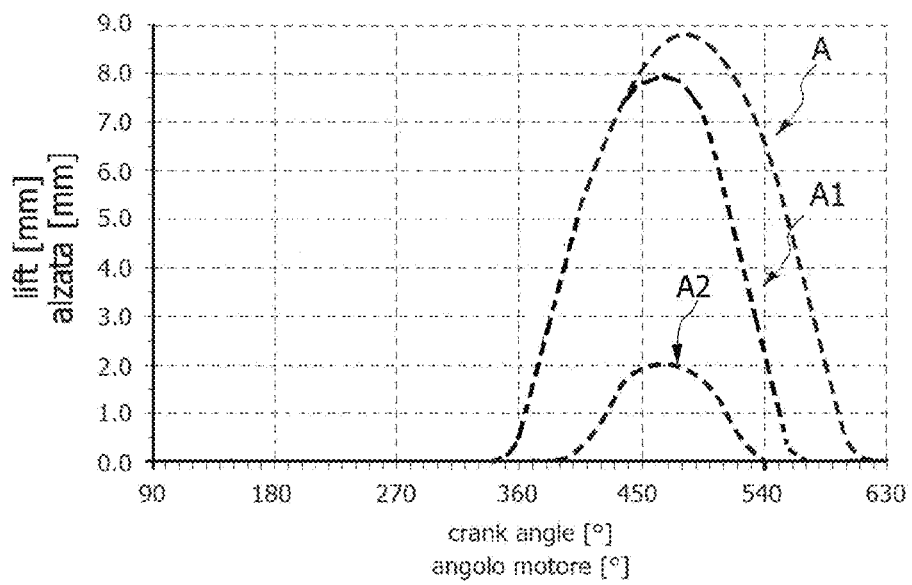
Figure 6:
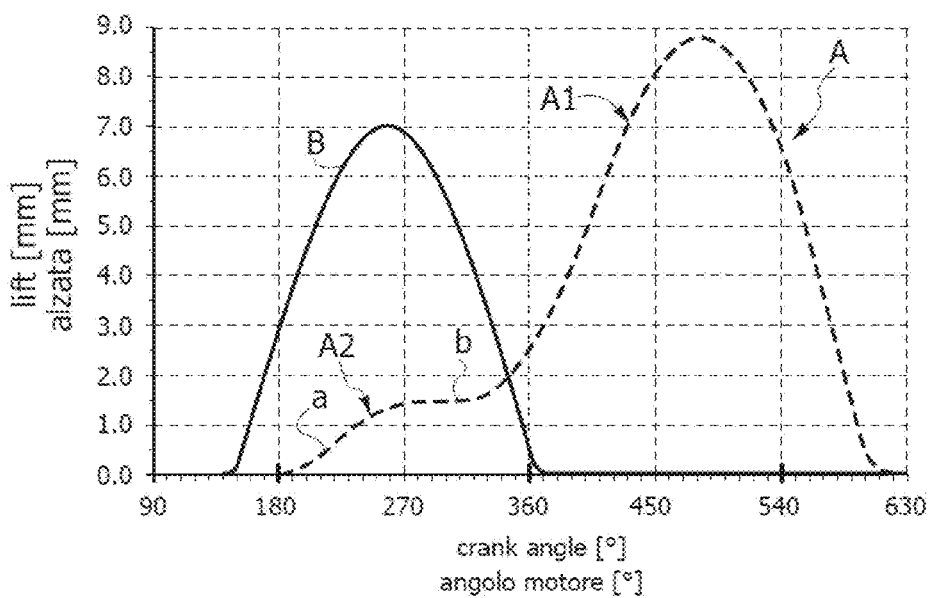

Further characteristics and advantages of the invention will be apparent from the following description with reference to the attached drawings, provided purely by way of non-limiting example, wherein:

FIG. 1 illustrates a block diagram of a power propulsion system of a motor vehicle of the "mild-hybrid" type, according to an embodiment of the present invention, FIG. 2 illustrates a simplified variant of the system of the FIG. 1, FIGS. 3, 4 are a sectional view and a corresponding schematic view of an internal combustion engine provided with the MULTIAIR system developed by the applicant, as illustrated for example in EP-A-1 936 132, and FIGS. 5, 6 are diagrams showing the lift profiles of the intake valves of the internal combustion engine in two different embodiments of the invention.

Though the preferred embodiment illustrated herein refers to a hybrid vehicle, provided with an internal combustion engine and an electric propulsion engine, the principles of the invention can also be applied to a conventional vehicle, solely provided with an internal combustion engine.

With reference to FIG. 1, a motor vehicle MV comprises a power transmission unit including a power propulsion system PWT and a transmission system T. The power propulsion system PWT includes an internal combustion engine ICE and a reversible electric machine EM. the power propulsion system may also comprise one or more auxiliary devices AUX, for example including an air conditioning system compressor. The electric motor EM and the auxiliary components AUX are connected to the internal combustion engine ICE through a belt transmission B including a belt and a plurality of pulleys P1, P2, P3 and a belt-stretching device (not illustrated, which can be of any known type). The pulley P3 is mounted on the output shaft of the electric machine EM, which constitutes a BAS unit adapted to operate as an alternator, for generating electrical power, when it is driven by the internal combustion engine, as a starter for starting the internal combustion engine, and as an electric motor for actuating auxiliary devices AUX. Furthermore, as indicated hereinafter, the machine EM can also be used, in given operating conditions, as the only propulsion engine of the vehicle. The pulley P2 is mounted on the upstream end of the internal combustion engine shaft ICE, while one or more pulleys P1 (only one of which is illustrated) is mounted on the shaft of each auxiliary device, if required by interposing an engagement device, which allows decoupling the auxiliary device from the belt transmission. As indicated, the system of pulleys P1, P2, P3 and the transmission belt B are capable of transmitting the propulsion torque produced by the electric machine to the shaft of the engine ICE and to the auxiliary components AUX and vice versa transmitting the propulsion torque produced by the engine ICE to the electric machine EM and to the auxiliary components AUX through the internal combustion engine. the power propulsion system PWT includes two electrical sections V1,V2 with different voltages to which there are respectively connected two accumulators ACC1, ACC2, auxiliary electric loads and a DC-DC voltage converter capable of bidirectionally controlling the energy exchange between the two sections. the power propulsion system further includes an inverter INV for the power control of the electric machine EM.

The transmission line T comprises a gearbox G of the electric, or electrohydraulic, or electromechanical type, with discrete ratios, of the of the gear type, having an input shaft that can be coupled to the drive shaft CS through an engagement and one or more clutches C and an output shaft or coupled to a pair of drive wheels W through a differential D of any known type. The clutch C, which can be single or double, is servo-controlled through an associated actuator CA with electric or electrohydraulic control. Also the gearbox G is servo-controlled through a plurality of actuators with electric or electrohydraulic or electromechanical control, indicated in its entirety with GA, which can be operated to perform the engagement and the disengagement of the gears corresponding to the different obtainable gear ratios.

The internal combustion engine ICE is controlled by an electronic control unit E-ECU of the per se known type and thus not described in detail, while the inverter INV of the electric machine EM is controlled by an electronic control unit EM-ECU. therefore the power transmission unit PWT includes three electronic control units (PWT-ECU, E-ECU and EM-ECU) capable of respectively controlling the transmission line alongside the gearbox unit, the internal combustion engine and the electric machine EM. The aforementioned electronic control units exchange messages through a network CAN.

FIG. 2 illustrates, by way of example, a simplified variant in which the gearbox G is of the conventional type, controlled manually.

FIG. 3 and FIG. 4 of the attached drawings refer to an example of an internal combustion engine of the known type provided with the MULTIAIR system developed by the applicant, for the variable actuation of the intake valves. FIG. 1 illustrates in particular a sectional view of a cylinder head of a four-cylinder internal combustion engine.

With reference to FIG. 3, the cylinder head, indicated in its entirety with reference number 1, comprises, for each cylinder, a cavity 2 formed on the lower surface thereof 3 defining the combustion chamber, in which two intake conduits 4 (only one of which is shown in the figure) and two exhaust conduits (not shown in the figure) terminate. The communication of the two intake conduits to the combustion chamber 2 is controlled by two intake valves 5 (only one of which is shown in the figure) each comprising a stem 6 slidably mounted in the body of the head 1. Each valve 6 is returned towards the closing position by a spring 7 interposed between an inner surface of the head 1 and an end cup of the valve. The communication of the two exhaust conduits to the combustion chamber is controlled by two valves of the conventional type (not shown in the figure) to which there is also associated springs for return towards the closed position.

The opening of each intake valve 6 is controlled, as described hereinafter, by a camshaft 8 mounted rotatably around an axis 9 within supports (not shown in the figure) of the head 1, and comprising a plurality of cams 10 for the actuation of the intake valves 5.

Each cam 10 cooperates with a tappet 11 which in the case of the illustrated example is constituted by an arm oscillatably mounted at an end 12 thereof on the structure of the head cylinders and having a central portion thereof which rotatably freely supports a roller 13 cooperating with the cam 10. the opposite end 14 of the oscillating arm 11 controls a pumping piston 15 through a plate 16 connected to the piston 15. The latter is returned by a spring 17 against the arm 11, so as to maintain the arm 11 in cooperation contact with the cam 10. The pumping piston 15 is slidably mounted in a cavity which is obtained in a pre-assembled block 18 which is mounted on the head 1 and which incorporates all the electrical and hydraulic devices part of the system for variable actuation of the intake valves the engine is provided with, according to what is described in detail hereinafter.

The pumping piston 15 is capable of transmitting a thrust to the stem 6 of each intake valve 5, so as to cause the opening of the latter against the action of the spring 9, through a pressurised fluid (preferably oil coming from the engine lubrication circuit) present in a pressure chamber C to which the pumping piston 15 is faced. Following the thrust applied by the pumping piston 15, the pressurised oil is transferred from the chamber C to the chamber of a hydraulic actuator 19 whose piston 20 pushes the valve 5 towards the open position.

All the previously described parts are also shown in FIG. 4, which shows a schematic representation of the system illustrated in FIG. 3.

With reference to both FIGS. 3, 4, the pressurised fluid chamber C associated to the intake valves 5 of each cylinder may be placed in communication with an exhaust channel 21 through a solenoid valve 22 controlled by a programmable electronic control unit 23. the solenoid valve 22, which can be of any known type, suitable for the function illustrated herein, is controlled by the control unit 23 as a function of signals S indicating engine operation parameters, such as the position of the accelerator and the number of engine revolutions.

When the solenoid valve 22 is open, the chamber C enters in communication, through a channel 24 and a circumferential chamber 25 (FIG. 2) with the exhaust channel 21. hence the pressurised fluid present in the chamber C flows in such channel and there is obtained a decoupling of the cam 10 and the tappet 7 with respect to the intake valves 5, which thus quickly return in the closing position thereof, under the action of the return springs 9, should they be in the open condition, corresponding to a phase in which the tappet 11 is in contact with the lobe of the cam 10.

The exhaust channel 21 communicates, according to a solution previously proposed by the applicant, with a tank 26, vented at the upper part with respect to the atmosphere in 27. The tank 26 in turn communicates through a conduit 28 with an accumulator of pressurised fluid 29 (schematically illustrated in the FIG. 2).

Lastly, the exhaust tank 26 communicates with a conduit 30 connected to the engine lubrication circuit through a conduit 31 in which there is interposed a check-valve 32 which allows the fluid to flow only in the direction of the tank 26.

In the illustrated example, the engine exhaust valves are controlled conventionally, through a respective camshaft and a mechanical transmission. However, according to the invention, it can also not be excluded that the exhaust valves be controlled variably, having a system of the type described above for the intake valves.

In the engine operation, should the solenoid valve 22 be maintained closed, the chamber C remains full of pressurised fluid and the movements of the cam 10 are transmitted to the intake valves 5 according to a lift profile which corresponds to the cam profile 10. The control unit 23 is however programmed to connect the chamber C to discharge in given engine operating conditions with the aim of causing the closing of the intake valves even when the cam 10 would tend to keep them open. Thus, such solution allows varying the opening time (as the duration of the opening, as time of start and time of end of the opening) and/or lift of the intake valves at will, for example to obtain a delayed opening and/or advance closing or to obtain a plurality of openings and closings within the conventional intake valves opening phase, according to the description subject of the previous patents of the applicant.

Still with reference to FIG. 3, it should be observed that the actuator 20 is further provided with hydraulic braking means which slow the final closing travel of the intake valve 5 when the latter closes following an opening of the solenoid valve 22, so as to avoid an excessive impact and an ensuing damaging of the intake valve upon reaching the closed position. The hydraulic braking means are not described herein, in that they can be obtained in any one of the methods known from the previous patent documents of the applicant.

Returning to the systems illustrated in FIGS. 1 and 2, in both embodiments it is provided for that, in given operating conditions, the vehicle be solely operated by the electric machine EM ("e-motoring" condition).

In such operating condition, the internal combustion engine ICE is off, i.e. moved to a cut-off condition. In such condition, the pistons of the engine ICE move due to the rotation of the drive shaft, which serves as a simple transmission shaft between the pulley P2 which receives the motion from the electric machine EM through the belt transmission B, and the transmission system T, connecting the output end of the drive shaft CS to the wheels W of the motor vehicle.

In such operating condition, the system according to the invention is capable reducing the pumping losses due to the movement of the pistons in the engine cylinders, due to the fact that the internal combustion engine ICE is provided with a system for variable actuation of the intake valves.

As previously indicated, preferably the system for variable actuation that the engine ICE is provided with is the MULTIAIR system developed by the applicant, which was described above with reference to the attached FIGS. 3,4.

According to a first solution, in the "e-monitoring" phases in which the vehicle is solely operated by the electric machine EM, the pumping losses of the engine are reduced closing the intake valve in advance, according to the valve lift scheme illustrated in FIG. 5, where the profile A is the lift profile of each intake valve determined by the profile of the respective cam, while the profile A1 shows an example of valve control with closing in advance, obtainable by connecting the respective pressure chamber to discharge in advance with respect to the normal closing determined by the cam profile.

In a particularly preferred variant of the invention, which is described herein with reference to FIG. 6, the system is also capable of further reducing the losses due to the pumping effect during the e-motoring phase, causing a supplementary opening of the intake valves during the phase theoretically corresponding to the conventional exhaust phase. the use of the MULTIAIR system for obtaining an additional opening of the intake valves during the conventional exhaust phase is per se known for example from the previous document EP-A-1 936 132 of the applicant.

In the case of the preferred embodiment of the present invention, the cams for the actuation of the intake valves of the engine each have, as shown in FIG. 4, a profile comprising a main portion 10a for causing the opening of the intake valve during the conventional intake phase in the respective cylinder of the engine and an additional portion 10b for causing a partial opening of the intake valves even during the conventional exhaust phase in the respective cylinder.

FIG. 6 of the attached drawings shows a diagram which represents the lift profiles of the intake valve and the exhaust valve of an engine cylinder thus obtained.

In such figure, the profile A is that regarding the lift of the intake valve, and the profile B is that regarding the exhaust valve. the diagram shows the lift in mm as a function of the crank angle. In the convention assumed in the diagrams of FIGS. 5 and 6, the 180° crank angle corresponds to the condition in which the piston is at the Bottom Dead Centre, at the beginning of the exhaust phase in the cylinder. The 360° angle corresponds to the condition in which the piston has reached the Top Dead Centre, at the end of the exhaust phase and at the beginning of the subsequent intake phase, which theoretically terminates at a crank angle equivalent to 540°, where the piston is once again positioned at the Bottom Dead Centre. As observable in FIG. 6, the profile A has a main portion A1 (having the conventional bell-like shape) which causes the opening of the valve during the normal intake phase in the cylinder and an additional portion A2, which causes an additional lift of the intake valve during the exhaust phase. the additional profile A2 substantially extends starting from an angle equivalent to 180° (Bottom Dead Centre), at the beginning of the exhaust phase, with a first ascending section "a" connected with a second section "b" with substantially constant lift, equivalent to a fraction of the maximum lift achieved by the intake valve during the intake phase. The sections A1 and A2 of the lift profile A of the intake valve are determined by the corresponding cam profile 10 (FIG. 4), having the main portion 10a corresponding to the portion A1 of the lift profile and the additional portion 10b corresponding to the portion A2 of the lift profile.

With the cams profiled as illustrated in FIG. 4, should one intend to cause the supplementary opening of the intake valve during the theoretical exhaust phase, it is sufficient that the control maintains the pressure chamber associated to each intake valve at the profile 10b of the cam. the opening of the intake valves during the theoretical exhaust phase allows sending in the intake conduit of each cylinder part of the exhaust gases previously formed in the last engine operating cycle, immediately before the cut-off required to obtain the e-motoring condition. Suitably controlling the opening and the closing of the intake valves, and maintaining the closed exhaust valves, thus allows such amount of exhaust gas to move alternatingly between the combustion chamber of each cylinder and the respective intake conduit. This allows avoiding introducing comburent and fuel into each cylinder, hence the pumping losses are minimised.

Obviously it is preferable to adopt both solutions described above, i.e. both the additional opening of the intake valves in the exhaust phase (FIG. 6), and the closing of the intake valves in advance during the conventional intake phase (FIG. 5)

According to a further solution, in such embodiment it is provided for that said system for variable actuation of the intake valves be controlled so as to differently actuate intake valves associated to different cylinders or so as to differently actuate the same intake valve over time, as a function of the engine operating conditions, which are detected by the electronic control unit through a plurality of sensors.

The e-motoring condition is activated, according to such embodiment, in a condition in which the motor vehicle is stationary, to execute an "e-launch" strategy, i.e. a vehicle start in stationary condition using the electric propulsion alone and with the internal combustion engine off and driven by the BAS unit.

Entry in the e-motoring condition with the vehicle moving is actuated in case of specific conditions of the vehicle (for example covering road sections with constant power delivered to the ground), the internal combustion engine (for example operation in low efficiency conditions), the electrical system (for example accumulators ACC1 and ACC2 with suitable charge conditions).

Still in case of such embodiment, when the aforementioned e-motoring operating condition is activated, the switching off of the engine is accelerated, with the aim of being able to promptly restart it in case of a change-of-mind of the driver.

According to the invention, the acceleration of the switching off is obtained by temporarily increasing (instead of reducing) the pumping losses of the internal combustion engine, by controlling the system for variable actuation of the intake valves such to cause a delayed opening (see line A2 in FIG. 5), or a total absence of opening of the intake valves.

According to the invention, the control logic of the intake valves of the internal combustion engine may be allocated in any of the aforementioned electronic control units. It is automatically activated on the basis of any input, preferably selected from among the following:
  accelerator pedal position signal;
  brake pedal position signal;
  clutch condition signal (both for manual and robotized gearboxes);
  signal indicating the speed of the vehicle;
  signal indicating the engaged gear, in case of a robotized gearbox, or engagement of a neutral gear for manual gears.

The system described above allows providing the following operating modes:
  gear with torque supply from the internal combustion engine alone (accelerator pressed, brake released, clutch closed, non-zero speed): the intake valves of the internal combustion engine are controlled so as to optimise the combustion efficiency, according to the conventional use of the MULTIAIR system;
  gear with torque supply from the electric motor alone (e-motoring) in which the internal combustion engine is driven by the electric motor or it is in deceleration phase for cut-off (accelerator released, brake released, clutch closed, non-zero speed): in such conditions the intake valves of the engine are controlled so as to minimise the pumping losses (FIGS. 5, 6), so as to minimise the deceleration of the vehicle, while the fuel injection is temporarily inhibited to minimise fuel consumption;
  freewheel operating mode, with an internal combustion engine off and the wheels of the vehicle not connected to the power propulsion system: during the freewheel operation, two situations may occur with the internal combustion engine in run-down mode:
    speed of the internal combustion engine above the minimum-run threshold: in this situation the intake valves are controlled so as to temporarily minimise the pumping losses to increase the engine run-down time, to allow a possible freewheel output with fuel re-injection (thus avoiding a BAS or starter engine start, if a starter is also provided for besides the BAS, i.e. an electric start motor);
    speed of the engine below the minimum-run threshold: in this situation the following strategies may be actuated:
    the intake valves are controlled so as to temporarily minimise the pumping losses to increase the engine run-down time to prepare to restart the engine (in case of change-of-mind of the driver) by engaging the clutch ("clutch pulse", only in case of automatic gearbox) or through BAS ('BAS cranking') or through a starter ('starter cranking') of the type capable of restarting the engine even at non-zero engine speed;
    the intake valves are controlled so as to temporarily maximise the pumping losses to reduce the engine run-down time with the aim of allowing a possible engine restart through a conventional starter as soon as possible, if it is not possible to perform a clutch restart given that the gearbox is manual, or through BAS;

phase for starting the internal combustion engine (accelerator released, brake released, clutch open, zero speed): the intake valves of the engine are controlled so as to minimise the pumping losses (FIGS. 5, 6) for minimising the time for starting the internal combustion engine, using the electric machine EM as a starter.

The main characteristic of the present invention, which can be applied both on a hybrid vehicle of the type described above and in a conventional vehicle, provided with the internal combustion engine alone, regards the aforementioned phase of operation with the vehicle moving and internal combustion engine in cut-off condition. In such condition, according to the main characteristic of the invention, the system for variable actuation of the intake valves is controlled to vary the opening time and/or closing time and/or the lift of the intake valves so as to control the losses due to the pumping effect which occur within the engine in said cut-off condition, according to one of the following strategies:

if the speed of the engine is above the minimum-run threshold, the intake valves are controlled so as to temporarily minimise the pumping losses, to increase the engine run-down time, so as to allow a possible change-of-mind of the driver, and a restart of the engine by reactivating the fuel supply;

if the speed of the engine is below the minimum-run threshold one of the following strategies are actuated:

if the motor vehicle is provided with an electric start motor capable of operating with the internal combustion engine moving, the intake valves are controlled so as to temporarily minimise the pumping losses to increase the run-down time, i.e. the time required to reach the stop of the drive shaft, so as to be able to restart the internal combustion engine when it is still moving;

if the motor vehicle is provided with an electric start motor capable of operating only when the internal combustion engine is stationary, the intake valves are controlled so as to temporarily maximise the pumping losses to reduce the engine run-down time, with the aim of allowing a possible engine restart with the engine stationary as soon as possible.

Preferably, the system for variable actuation of the intake valves is also controlled to reduce the pumping losses in the phase in which the internal combustion engine is started through an electric start motor.

In the case of a conventional vehicle, the management of the vehicle coast-down with an internal combustion engine in cut-off can be carried out through an optimised management of the intelligent alternator logic (regulation of the alternator regulator set-point).

Obviously, without prejudice to the principle of the invention, the construction details and the embodiments may widely vary with respect to what has been described and illustrated purely by way of example, without departing from the scope of protection of the present invention.

The invention claimed is:

1. Method for controlling a motor vehicle provided with an internal combustion engine having a system for variable actuation of intake valves, wherein said method comprises a phase of activation of an operating mode with the engine off and the vehicle moving, in which the fuel supply to the engine is cut-off, and in that after the cut-off of the fuel supply to the engine the system for variable actuation of the intake valves is controlled to vary the opening time and/or closing time and/or the lift of the intake valves so as to control the losses due to a pumping effect which occur within the engine in said cut-off condition, according to one of the following strategies:

if the speed of the engine is above a minimum-run threshold, the intake valves are controlled so as to temporarily minimize the pumping losses, to increase an engine run-down time required to reach a stop of a drive shaft of the engine, so as to allow a possible change-of-mind of the driver, and a restart of the engine by reactivating the fuel supply;

if the speed of the engine is below the minimum-run threshold one of the following strategies are actuated:

if the motor vehicle is provided with an electric start motor capable of operating with the internal combustion engine moving, the intake valves are controlled so as to temporarily minimize the pumping losses to increase the run-down time so as to be able to restart the internal combustion engine when it is still moving;

if the motor vehicle is provided with an electric start motor capable of operating only when the internal combustion engine is stationary, the intake valves are controlled to temporarily maximize the pumping losses to reduce the engine run-down time, with the aim of allowing a possible engine restart, with the engine stationary, as soon as possible; and wherein the control of the intake valves to temporarily maximize the pumping losses of the internal combustion engine is obtained by controlling the system for variable actuation of the intake valves to cause a delayed opening of the intake valves with respect to a conventional intake cycle, or a total absence of opening of the intake valves.

2. Method according to claim 1, wherein the system for variable actuation of the intake valves is also controlled to reduce the pumping losses in the phase in which the internal combustion engine is started through an electric start motor.

3. Method according to claim 1, in which the internal combustion engine is provided with a system for variable actuation of the engine valves comprising at least one camshaft connected to the drive shaft, in which each intake valve is controlled by a respective tappet actuated by a respective cam of said camshaft, against the action of spring means associated to each intake valve which return the intake valve towards a closed position, and in which said tappet is connected to said intake valve through hydraulic actuation means, comprising a pressure hydraulic chamber which can be connected to an exhaust channel through an electronically controlled solenoid valve, so as to uncouple the intake valve from the respective cam and cause the closing thereof due to said return spring means.

4. Method according to claim 1, wherein said system for variable actuation of the intake valves is controlled so as to differently actuate intake valves associated to different cylinders and/or so as to differently actuate the same intake valve over time as a function of the engine operating conditions, detected by an electronic control unit through a plurality of sensors.

5. Method according to claim 1, wherein said vehicle is provided, additionally to the internal combustion engine, with an electric motor kinematically connected to the internal combustion engine, upstream of the internal combustion engine such that the internal combustion engine kinematically interposed between the electric motor and the driven wheels of the vehicle and in that there is provided an e-motoring phase in which the electric motor is used as the only motor vehicle propulsion engine, with the internal combustion engine in cut-off condition, and in that in such e-motoring phase the system for variable actuation of the intake valves is controlled to reduce the pumping losses of the engine.

6. Method according to claim 1, wherein the reduction of the pumping losses of the internal combustion engine is obtained by controlling the system for variable actuation of the intake valves such to cause a closing of the intake valves in advance with respect to a conventional intake cycle.

7. Method according to claim 6, wherein said system for variable actuation of the intake valves is controlled so as to open the intake valves during a phase which—during the normal operation of the engine—corresponds to the exhaust phase, with the aim of obtaining a recirculation—in each cylinder—of the exhaust gases produced in the engine immediately before the cut-off phase.

8. Method for controlling a motor vehicle provided with an internal combustion engine having a system for variable actuation of intake valves, wherein said method comprises a phase of activation of an operating mode with the engine off and the vehicle moving, in which the fuel supply to the engine is cut-off, and in that after the cut-off of the fuel supply to the engine the system for variable actuation of the intake valves is controlled to vary the opening time and/or closing time and/or the lift of the intake valves so as to control the losses due to a pumping effect which occur within the engine in said cut-off condition, according to one of the following strategies:
   if the speed of the engine is above a minimum-run threshold, the intake valves are controlled so as to temporarily minimize the pumping losses, to increase an engine run-down time required to reach a stop of a drive shaft of the engine, so as to allow a possible change-of-mind of the driver, and a restart of the engine by reactivating the fuel supply;
   if the speed of the engine is below the minimum-run threshold one of the following strategies are actuated:
   if the motor vehicle is provided with an electric start motor capable of operating with the internal combustion engine moving, the intake valves are controlled so as to temporarily minimize the pumping losses to increase the run-down time so as to be able to restart the internal combustion engine when it is still moving;
   if the motor vehicle is provided with an electric start motor capable of operating only when the internal combustion engine is stationary, the intake valves are controlled so as to temporarily maximize the pumping losses to reduce the engine run-down time, with the aim of allowing a possible engine restart, with the engine stationary, as soon as possible; and
   wherein the reduction of the pumping losses of the internal combustion engine is obtained by controlling the system for variable actuation of the intake valves to cause a closing of the intake valves in advance with respect to a conventional intake cycle.

9. Method for controlling a motor vehicle provided with an internal combustion engine having a system for variable actuation of intake valves, wherein said method comprises a phase of activation of an operating mode with the engine off and the vehicle moving, in which the fuel supply to the engine is cut-off, and in that after the cut-off of the fuel supply to the engine the system for variable actuation of the intake valves is controlled to vary the opening time and/or closing time and/or the lift of the intake valves so as to control the losses due to a pumping effect which occur within the engine in said cut-off condition, according to one of the following strategies:
   if the speed of the engine is above a minimum-run threshold, the intake valves are controlled so as to temporarily minimize the pumping losses, to increase an engine run-down time required to reach a stop of a drive shaft of the engine, so as to allow a possible change-of-mind of the driver, and a restart of the engine by reactivating the fuel supply;
   if the speed of the engine is below the minimum-run threshold one of the following strategies are actuated:
   if the motor vehicle is provided with an electric start motor capable of operating with the internal combustion engine moving, the intake valves are controlled so as to temporarily minimize the pumping losses to increase the run-down time so as to be able to restart the internal combustion engine when it is still moving;
   if the motor vehicle is provided with an electric start motor capable of operating only when the internal combustion engine is stationary, the intake valves are controlled so as to temporarily maximize the pumping losses to reduce the engine run-down time, with the aim of allowing a possible engine restart, with the engine stationary, as soon as possible;
   wherein the reduction of the pumping losses of the internal combustion engine is obtained by controlling the system for variable actuation of the intake valves such to cause a closing of the intake valves in advance with respect to a conventional intake cycle; and
   wherein said system for variable actuation of the intake valves is controlled so as to open the intake valves during a phase which—during the normal operation of the engine—corresponds to the exhaust phase, with the aim of obtaining a recirculation—in each cylinder—of the exhaust gases produced in the engine immediately before the cut-off phase.

* * * * *